Feb. 7, 1933.　　　B. L. QUARNSTROM　　　1,896,416
APPARATUS FOR MAKING TUBES
Filed July 21, 1930　　　2 Sheets-Sheet 1
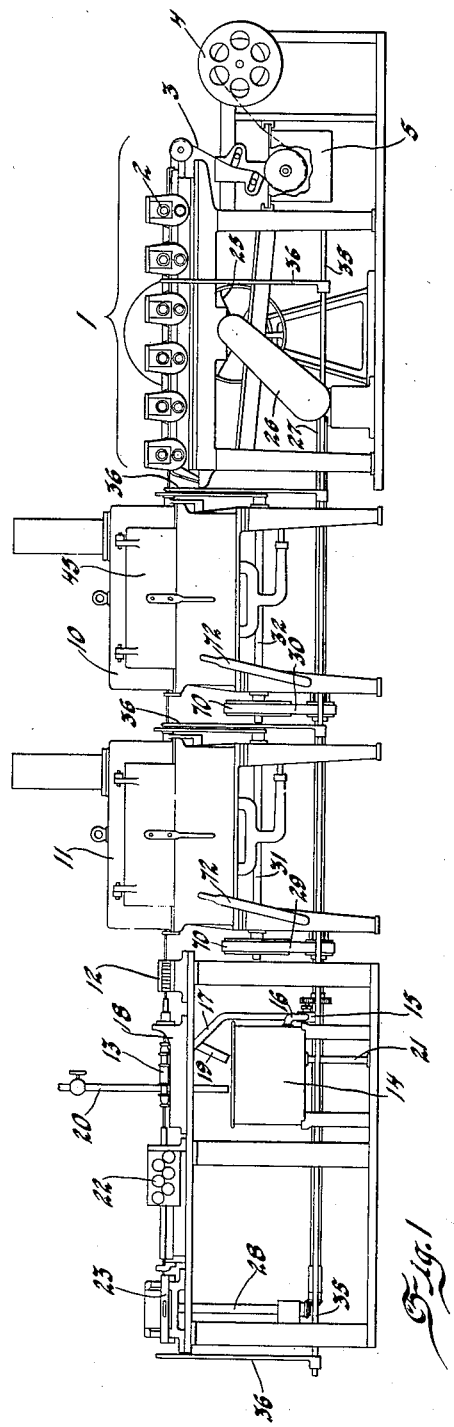
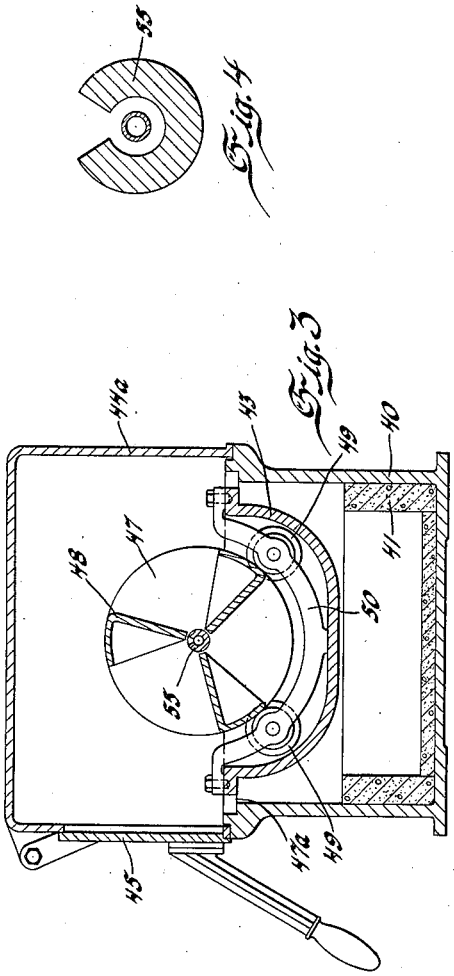
INVENTOR
Bert L. Quarnstrom
BY
ATTORNEY

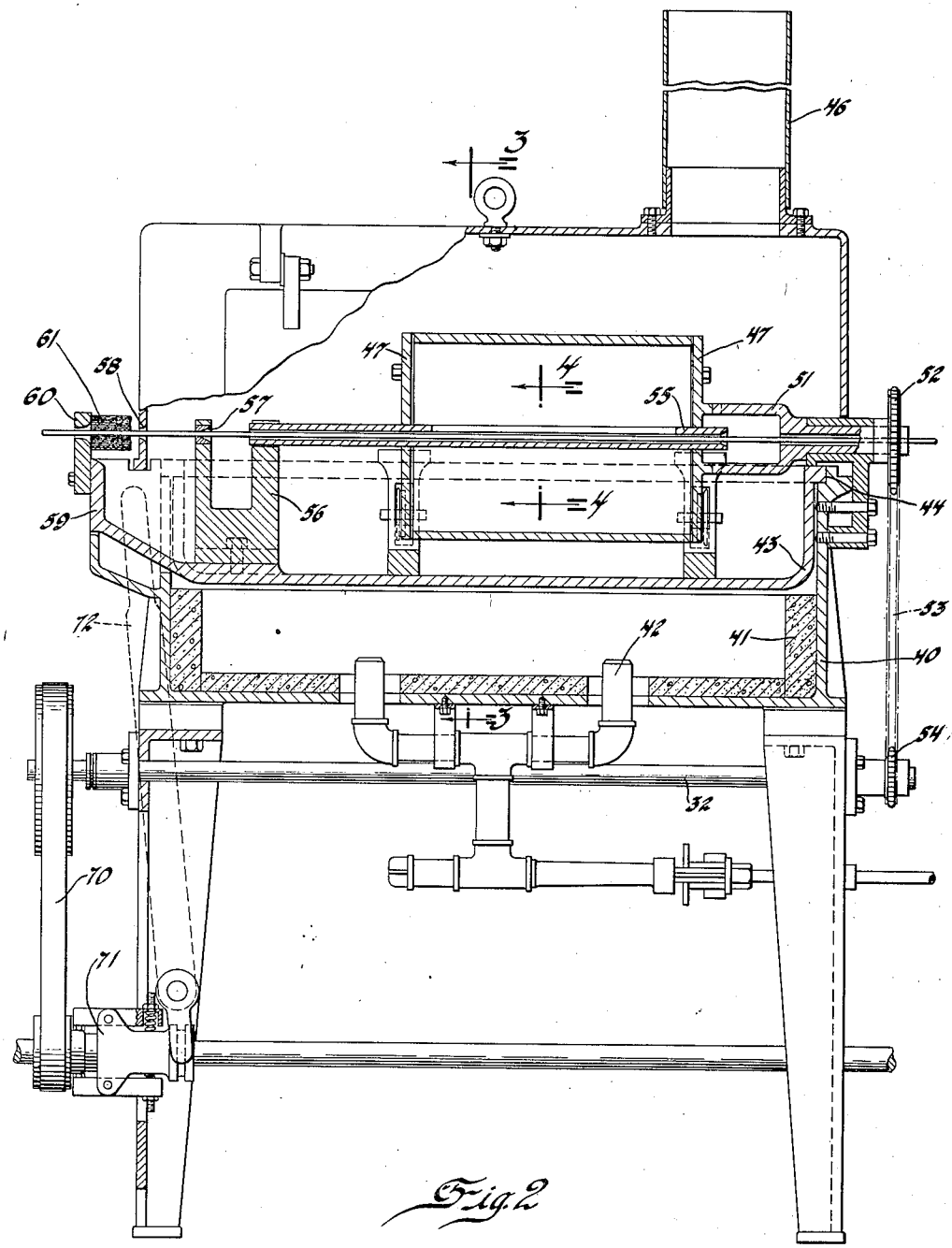

Patented Feb. 7, 1933

1,896,416

UNITED STATES PATENT OFFICE

BERT L. QUARNSTROM, OF GROSSE POINTE PARK, MICHIGAN, ASSIGNOR TO BUNDY TUBING COMPANY, OF DETROIT, MICHIGAN, A CORPORATION OF MICHIGAN

APPARATUS FOR MAKING TUBE

Application filed July 21, 1930. Serial No. 469,347.

This invention relates to an apparatus for making tube and it is concerned particularly with the making of tube which is sealed by molten metal. The particular tubing may be of the type which is formed by a strip of stock fashioned into hollow cross sectional shape as the strip of stock moves, with the fashioned form then being sealed by the molten metal.

The invention comprises essentially employing devices which may be termed solder pots in which the molten solder or other sealing metal is maintained in molten condition, and the tube is moved through the pots at which time it is subjected to a bath of molten solder. The term solder herein is used in a broad sense and it is intended to cover molten metals suitable for the purpose such as an alloy of lead and tin, a copper silver alloy, a copper and zinc alloy, or pure metals which may be found suitable.

In the accompanying drawings:

Fig. 1 is a side elevational view of an apparatus for forming and soldering tube.

Fig. 2 is a detailed view with some of the parts in section showing a solder pot.

Fig. 3 is a sectional view taken substantially on line 3—3 of Fig. 2.

Fig. 4 is an enlarged cross sectional view taken on line 4—4 of Fig. 2.

A tube forming machine represented generally by the character 1 comprises a series of forming rollers 2 through which a strip of stock, as illustrated at 3, is drawn and shaped into hollow cross sectional form. This strip of stock may be of indefinite length and kept upon a reel 4, and as it is drawn from the reel it is passed through a container 5 where it is given a bath of suitable flux or an oil. The strip is then suitably guided and drawn through the set of forming rolls 1; these rolls are of a type known to those skilled in the art and serve to form the strip so that it is hollow in cross section, or in the shape of a tube. Different types of tube may thus be formed, as for example—lap seam tube, lock seam tube, butt seam tube, or the type of tube such as shown in my Patent #1,431,368 of October 10, 1922, involving a double wall structure. Solder is now applied to the tube and this is done by means of solder applying mechanism of which, advantageously, there are a plurality of units, two in the present instance, one illustrated at 10 and the other at 11. The structure of these units and the purpose for employing more than one will later be discussed. The tube upon leaving the solder pot 11 is guided as by means of a device 12, and then is cooled as by means of passing through pipe and fitting assembly 13. The cooling is provided by means of water contained in tank 14 which is circulated by means of a pump 15 through conduits 16 and 17 to the assembly 13, the water discharging from the ends of the assembly 13 into the pan 18, thence flowing back into tank 14 through conduit 19. The water may be replenished when desired through conduit 21 which is controlled by a valve. The tube then passes through rollers 22 which serve to pull it, and then another set of rollers which may be horizontally positioned and held by bracket 23, the rollers themselves not being shown but forming no essential part of the present invention.

The whole machine may be driven by means of a pulley 25, which through suitable gearing (not shown) drives the rollers 1, and by means of a chain in casing 26 drives the shaft 27. This shaft, through the vertically disposed shaft 28, drives the rollers 22 and 23, and through the belts 29 and 30 drive countershafts 31 and 32, for the solder applying devices. A control shaft 35 may extend the length of the machine and be provided with a plurality of control levers 36 at spaced points by means of which the machine may be started and stopped by an operator at most any position along the length of the machine.

The details of the solder pots are shown in Figs. 2 and 3, and the pots comprise a combustion chamber formed by a casting or the like 40, which may be lined with fire clay 41 having apertures for receiving gas burners 42. The solder pot per se is shown at 43 and rests upon the upper edge of the member 40 as at 44. Over the solder pot is a hood 44a provided with a door 45; leading from the hood is a chimney 46, there being a passageway 47a between the solder pot per se and member 44 so that the products of combustion may pass from the combustion chamber up the chimney.

Positioned in the compartment is a solder lift or wheel more or less in the form of a drum having end plates 47 between which are disposed solder elevating paddles or buckets 48. This drum rests upon rollers 49, two at each end, journaled in brackets 50. The drum is rotated by means of a hollow spindle 51 upon which is a sprocket wheel 52 over which chain 53 runs running over sprocket wheel 54 on the countershaft 32. The tubing passes through the hollow spindle 51 and then through the axial center of the drum, and in the axial center of the drum is a pipe 55 provided with a slot which advantageously is V shape, as illustrated in Fig. 4. The pipe is larger than the tube after the manner illustrated in said figure. One end of this pipe may merely rest in one of the end plates 47 while the other end is held in a bracket 56 which holds it against rotation. The tube passes through the pipe and the bracket 56 may have a wiper die 57 designed to scrape solder from the surface of the tube, and then the tube passes out through the aperture 58. The bottom of the solder pot per se may project beyond the hood as illustrated at 59 and be provided with a bracket 60. The tube may be wiped at this point by means of a cloth 61, or the like, wrapped around the tube between the hood and the bracket 60, and any solder wiped off falls into the projecting part 59 and goes back into the solder pot.

In the operation of the device the strip stock moves continuously from the reel through the forming rolls, the solder applying devices, the cooling unit and the pulling rolls. Molten solder is maintained in the pot 43 and at a level such that as the drum is rotated the buckets 48 will dip up some of the solder. It will be noted though, that the position of the tube is above the surface line of the solder. As the drum rotates the molten solder is elevated and dumped into the V shaped opening in the pipe 55 thus subjecting the tube to a bath of solder. The arrangement may be such that the pipe 55 has enough solder in it to give the tube a substantial bath. There is more or less a continuous movement of solder inasmuch as it flows out the ends of the pipe. The two units 10 and 11 are similar and may be identical. In the use of the apparatus it is preferred that the strip stock employed is tinned, and in the applying of the additional solder to the tube the tinned surfaces are sweated together by being rendered molten, and additional solder is supplied as well. The sweating operation is afforded by the heat to which the tube is subjected both by passing through the chamber containing the molten solder and by taking heat from the molten solder.

There is a distinct purpose for providing a plurality of the solder applying devices. By a plurality is meant at least two, although in some cases even more may be employed. In order to give tubes a bath effectively in this manner the tube must needs be heated, and the tube is heated by passing through the solder applying devices, and inasmuch as the tube is moving, the element of time becomes very important, with a given temperature in the solder applying devices, and of the molten sealing metal itself. The temperature within the solder applying device and the temperature of the solder usually runs fairly uniform. Accordingly, if the time period is short, the tube is not heated to a great degree, and if the time period is long it is heated to a higher degree. A long furnace for a solder bath device sufficient to effectively solder and heat the tube requires a large amount of solder even though the molten body of solder be relatively shallow. This means that the structure itself has to be relatively large and unwieldly and also an uneconomical manner of heating up such a large body of solder and maintain it heated. By using a plurality of smaller units, however, the units themselves are small, and access to the interior thereof is much more easily had in the event of anything going wrong or the like, and the quantity of solder employed is to a material degree smaller than would be required in a single bath sufficiently long for the purpose. Another feature is that specific gravity of solder, usually a lead and tin alloy, is high, and considerable weight is lifted by the buckets on the drums. Accordingly, it is advantageous to split up the arrangement so that the drums are shortened.

I claim:

1. A device for applying molten solder to a tube or the like, comprising a solder pot, a drum-like member having pockets, a pipe located on the axial center of the drum through which the tube is adapted to move, said pipe having a V opening, and means for rotating the drum so that the buckets elevate molten solder and dump the same into the opening.

2. A device for applying molten solder to a tube or the like, comprising a pot for molten solder, a rotatable drum having its axial center located above the level of the molten solder, a pipe on the axial center of the drum through which the tube or the like passes, having a V shaped opening, and buckets carried by the drum for elevating solder and dumping the same into the V shaped opening in the pipe.

3. A device for applying molten solder to a tube or the like, comprising a pot for molten solder, a rotatable drum having its axial center located above the level of the molten solder, a pipe on the axial center of the drum through which the tube or the like passes having a V shaped elongated opening, and buckets carried by the drum for elevating solder and dumping the same into the V shaped opening in the pipe.

4. A device for applying molten solder to a tube or the like, comprising a pot for molten solder, a rotatable drum having its axial center located above the level of the molten solder, a pipe on the axial center of the drum through which the tube or the like passes having an elongated opening, and buckets carried by the drum for elevating solder and dumping the same into the opening in the pipe, the ends of the said pipe being open whereby the excess solder flows out of said ends and back into the solder pot.

5. A device for applying molten solder to a longitudinally moving tube or the like comprising, a pot for holding molten solder, rollers positioned therein, a drum having spaced end walls carrying elongated buckets, said drum being positioned on the rollers, a pipe located on the axial center of the drum having an opening in its wall, and the said tube being adapted to move lengthwise through the pipe on the axial center of the drum, and means for rotating the drum so that the buckets dip the solder and dump the same into the opening of the pipe.

6. A device for applying molten solder to a longitudinally moving tube or the like comprising, a pot for holding molten solder, rollers positioned therein, a drum having spaced end walls carrying elongated buckets, said drum being positioned on the rollers, a pipe located on the axial center of the drum having an opening in its wall, and the said tube being adapted to move lengthwise through the pipe, the axial center of the drum being located above the level of the molten solder, means for rotating the drum so that the buckets elevate the solder and dump the same into the opening of the pipe, and means for holding the pipe from rotation with the opening positioned upwardly.

7. A device for applying molten solder to a longitudinally moving tube or the like comprising, a pot for holding molten solder, rollers positioned therein, a drum having spaced end walls carrying elongated buckets, said drum being positioned on the rollers, a pipe located on the axial center of the drum having an opening in its wall, and the said tube being adapted to move lengthwise through the pipe, the axial center of the drum being located above the level of the molten solder, means for rotating the drum so that the buckets elevate the solder and dump the same into the opening of the pipe, and means for holding the pipe from rotation with the opening being positioned upwardly, said opening being elongated with its length substantially corresponding to the length of the drum.

8. A solder applying device for a longitudinally moving tube or the like, comprising a solder pot, a hood therefor, guiding devices through which a tube moves longitudinally through the chamber formed by the pot and hood above the level of the solder, means for elevating the solder and pouring the same over the tube, the pot containing the molten solder projecting beyond the hood at the outlet end of the device, and means outside of the hood for wiping excess solder from the tube, and dropping the same into the projecting part of the solder pot.

9. A solder applying device for a longitudinally moving tube or the like, comprising a solder pot, a hood therefor, guiding devices through which a tube moves longitudinally through the chamber formed by the pot and hood above the level of the solder, means for elevating the solder and pouring the same over the tube, and a wiper die positioned within the solder pot for wiping excess solder from the tube, the pot containing the molten solder projecting beyond the hood at the outlet end of the device, and means outside of the hood for wiping excess solder from the tube, and dropping the same into the projecting part of the solder pot.

10. An apparatus for making tube from continuous strip stock comprising in combination, tube-forming means through which the strip and formed tube move with lengthwise movement and which fashions the stock into tube during such movement, a closed heating chamber positioned adjacent the tube-forming means through which the fashioned tube moves, a solder pot within the closed chamber for holding a body of molten solder and over which the tube moves, means within the closed chamber for subjecting the tube to a bath of such molten solder as the same moves through the chamber, a second closed heating chamber positioned adjacent the first mentioned heating chamber and the two chambers being arranged so that the moving tube passes out through the first chamber and into the second chamber with a relatively short length of tube between them, a solder pot within the second chamber for holding a body of molten solder which is entirely separate from the body of molten solder in the first chamber, and means within the second chamber for subjecting the tube to a bath of molten solder as the tube passes through the second chamber.

11. An apparatus for making tube from continuous strip stock comprising in combination, tube-forming means through which the strip and formed tube move with lengthwise movement and which fashions the stock into tube during such movement, a closed heating chamber positioned adjacent the tube-forming means through which the fashioned tube moves, a solder pot within the closed chamber for holding a body of molten solder and over which the tube moves, means within the closed chamber for subjecting the tube to a bath of such molten solder as the same moves through the chamber, a second closed heating chamber positioned adjacent the first mentioned heating chamber and the two chambers being arranged so that the moving tube passes out through the first chamber and into the second chamber with a relatively short length of tube between them, a solder pot within the second chamber for holding a body of molten solder which is entirely separate from the body of molten solder in the first chamber, and means within the second chamber for subjecting the tube to a bath of molten solder as the tube passes through the second chamber, both of said means for subjecting the tube to a bath of solder being arranged to subject an appreciable length of the tube to such bath at any given moment to effect a seal of a longitudinally running seam between parts of the formed strip stock.

In testimony whereof I affix my signature.

BERT L. QUARNSTROM.